US012299898B2

(12) United States Patent
Mahjourian et al.

(10) Patent No.: US 12,299,898 B2
(45) Date of Patent: May 13, 2025

(54) PREDICTING THE FUTURE MOVEMENT OF AGENTS IN AN ENVIRONMENT USING OCCUPANCY FLOW FIELDS

(71) Applicant: Waymo LLC, Mountain View, CA (US)

(72) Inventors: Reza Mahjourian, Austin, TX (US); Jinkyu Kim, Albany, CA (US); Yuning Chai, San Mateo, CA (US); Mingxing Tan, Newark, CA (US); Benjamin Sapp, Marina del Rey, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 313 days.

(21) Appl. No.: 17/698,930

(22) Filed: Mar. 18, 2022

(65) Prior Publication Data
US 2022/0301182 A1    Sep. 22, 2022

Related U.S. Application Data

(60) Provisional application No. 63/316,801, filed on Mar. 4, 2022, provisional application No. 63/162,988, filed on Mar. 18, 2021.

(51) Int. Cl.
G06T 7/20        (2017.01)
G06V 10/40       (2022.01)
(Continued)

(52) U.S. Cl.
CPC .............. *G06T 7/20* (2013.01); *G06V 10/40* (2022.01); *G06V 20/584* (2022.01);
(Continued)

(58) Field of Classification Search
CPC ............ G06T 7/20; G06T 2207/20081; G06T 2207/20084; G06T 2207/30256;
(Continued)

(56) References Cited

U.S. PATENT DOCUMENTS 10,839,203 B1 * 11/2020 Guigues ................. G06T 7/292
11,521,396 B1 * 12/2022 Jain ...................... G06F 18/2415
(Continued)

FOREIGN PATENT DOCUMENTS

CN     107274029 A     10/2017
CN     112154461 A     12/2020
WO     WO 2021/003379 A1  1/2021

OTHER PUBLICATIONS

Bansal et al., "Chauffeurnet: Learning to drive by imitating the best and synthesizing the worst," CoRR, Dec. 7, 2018, arxiv.org/abs/1812.03079, 20 pages.
(Continued)

*Primary Examiner* — Md K Talukder
(74) *Attorney, Agent, or Firm* — Fish & Richardson P.C.

(57) ABSTRACT

Methods, systems, and apparatus, including computer programs encoded on computer storage media, for predicting the future movement of agents in an environment. In particular, the future movement is predicted through occupancy flow fields that specify, for each future time point in a sequence of future time points and for each agent type in a set of one or more agent types: an occupancy prediction for the future time step that specifies, for each grid cell, an occupancy likelihood that any agent of the agent type will occupy the grid cell at the future time point, and a motion flow prediction that specifies, for each grid cell, a motion vector that represents predicted motion of agents of the agent type within the grid cell at the future time point.

20 Claims, 4 Drawing Sheets

(51) Int. Cl.
*G06V 20/56* (2022.01)
*G06V 20/58* (2022.01)

(52) U.S. Cl.
CPC .. *G06V 20/588* (2022.01); *G06T 2207/20081* (2013.01); *G06T 2207/20084* (2013.01); *G06T 2207/30256* (2013.01)

(58) Field of Classification Search
CPC ........... G06T 2207/30241; G06T 2207/30252; G06V 10/40; G06V 20/584; G06V 20/588; G06Q 10/04; G06Q 50/40; G06N 3/08
See application file for complete search history.

(56) References Cited

U.S. PATENT DOCUMENTS

| | | | |
|---|---|---|---|
| 2020/0110416 A1* | 4/2020 | Hong | G05D 1/0088 |
| 2021/0064890 A1* | 3/2021 | Murveit | G05D 1/0212 |
| 2021/0253128 A1* | 8/2021 | Nister | B60W 60/0027 |
| 2022/0155096 A1* | 5/2022 | Kim | G01C 21/3841 |
| 2022/0301182 A1* | 9/2022 | Mahjourian | G06T 7/20 |
| 2023/0084578 A1* | 3/2023 | Sadeghi | B60W 60/0011 701/23 |

OTHER PUBLICATIONS

Bhattacharyya et al., "Accurate and diverse sampling of sequences based on a "best of many" sample objective," Proceedings of the IEEE Conference on Computer Vision and Pattern Recognition (CVPR), 2018, pp. 8485-8493.
Buhet et al., "PLOP: Probabilistic polynomial objects trajectory planning for autonomous driving," CoRR, Mar. 9, 2020, arxiv.org/abs/2003.08744, 20 pages.
Casas et al., "IntentNet: Learning to predict intention from raw sensor data," Proceedings of the 2nd Conference on Robot Learning, 2018, 87:947-956.
Casas et al., "MP3: A Unified Model to Map, Perceive, Predict and Plan," CoRR, arXiv:2101.06806v1, Jan. 18, 2021, 22 pages.
Chai et al., "Multipath: Multiple probabilistic anchor trajectory hypotheses for behavior prediction," CoRR, Oct. 12, 2019, arxiv.org/abs/1910.05449, 14 pages.
Chang et al., "Argoverse: 3D tracking and forecasting with rich maps," Proceedings of the IEEE/CVF Conference on Computer Vision and Pattern Recognition (CVPR), 2019, pp. 8748-8757.
Chen et al., "Deeplab: Semantic image segmentation with deep convolutional nets, atrous convolution, and fully connected crfs," IEEE Transactions on Pattern Analysis and Machine Intelligence, Apr. 1, 2018, 40(4):834-848.
Cui et al., "Multimodal trajectory predictions for autonomous driving using deep convolutional networks," 2019 International Conference on Robotics and Automation (ICRA), May 20-24, 2019, pp. 2090-2096.
Extended Search Report in European Appln. No. 22163104.7, dated Aug. 5, 2022, 9 pages.
Fairfield et al., "Traffic light mapping and detection," 2011 IEEE International Conference on Robotics and Automation, May 9-13, 2011.
Gupta et al., "Social gan: Socially acceptable trajectories with generative adversarial networks," IProceedings of the IEEE Conference on Computer Vision and Pattern Recognition (CVPR), 2018, pp. 2255-2264.
Helbing et al., "Social force model for pedestrian dynamics," Physical review E, May 1, 1995, 51(5):4282.
Hong et al., "Rules of the Road: Predicting Driving Behavior With a Convolutional Model of Semantic Interactions," 2019 IEEE/CVF Conference on Computer Vision and Pattern Recognition (CVPR), Jun. 15, 2019, pp. 8446-8454.
Horn et al., "Determining optical flow," Artificial Intelligence, Aug. 1981, 17(1-3):185-203.
Ilg et al., "Flownet 2.0: Evolution of optical flow estimation with deep networks," Proceedings of the IEEE Conference on Computer Vision and Pattern Recognition (CVPR), 2017, pp. 2462-2470.
Jain et al., "Discrete residual flow for probabilistic pedestrian behavior prediction," Proceedings of the Conference on Robot Learning, 2020, 100:407-419.
Jonschkowski et al., "What matters in unsupervised optical flow," CoRR, Jun. 8, 2020, arXiv:2006.04902, 16 pages.
Kingma et al., "Adam: A method for stochastic optimization," CoRR, Dec. 22, 2014, arxiv.org/abs/1412.6980, 15 pages.
Kitani et al., "Activity forecasting," European Conference on Computer Vision, 2012, 14 pages.
Lang et al., "Pointpillars: Fast encoders for object detection from point clouds," Proceedings of the IEEE/CVF Conference on Computer Vision and Pattern Recognition (CVPR), 2019, pp. 12697-12705.
Lee et al., Desire: Distant future prediction in dynamic scenes with interacting agents, Proceedings of the IEEE Conference on Computer Vision and Pattern Recognition (CVPR), 2017, pp. 336-345.
Luo et al., "Fast and furious: Real time end-to-end 3D detection, tracking and motion forecasting with a single convolutional net," Proceedings of the IEEE Conference on Computer Vision and Pattern Recognition (CVPR), 2018, pp. 3569-3577.
Luo et al., "Safety-Oriented Pedestrian Motion and Scene Occupancy Forecasting," CoRR, arXiv:2101.02385v1, Jan. 7, 2021, 14 pages.
Mahjourian et al., "Occupancy Flow Fields for Motion Forecasting in Autonomous Driving," CoRR, Mar. 8, 2022, arxiv:2203.0387v1, 8 pages.
Mattyus et al., "Deeproadmapper: Extracting road topology from aerial images," Proceedings of the IEEE International Conference on Computer Vision (ICCV), 2017, pp. 3438-3446.
Mercat et al., "Multi-head attention for multi-modal joint vehicle motion forecasting," 2020 IEEE International Conference on Robotics and Automation (ICRA), May 31, 2020, pp. 9638-9644.
Pellegrini et al., "You'll never walk alone: Modeling social behavior for multi-target tracking," 2009 IEEE 12th International Conference on Computer Vision, Sep. 29, 2009, 8 pages.
Phan-Minh et al., "Covernet: Multimodal behavior prediction using trajectory sets," Proceedings of the IEEE/CVF Conference on Computer Vision and Pattern Recognition (CVPR), 2020, pp. 14074-14083.
Rhinehart et al., "Precog: Prediction conditioned on goals in visual multi-agent settings," Proceedings of the IEEE/CVF International Conference on Computer Vision (ICCV), 2019, pp. 2821-2830.
Sadeghian et al., "Car-net: Clairvoyant attentive recurrent network," Proceedings of the European Conference on Computer Vision (ECCV), 2018, pp. 151-167.
Salzmann et al., "Trajectron++: Multi-agent generative trajectory forecasting with heterogeneous data for control," European Conference on Computer Vision, 2020, pp. 683-700.
Tan et al., "Efficientdet: Scalable and efficient object detection," Proceedings of the IEEE/CVF Conference on Computer Vision and Pattern Recognition (CVPR), 2020, pp. 10781-10790.
Tan et al., "Efficientnet: Rethinking model scaling for convolutional neural networks," Proceedings of the 36th International Conference on Machine Learning, PMLR, 2019, 97:6105-6114.
Thrun et al., "Integrating grid-based and topological maps for mobile robot navigation," Proceedings of the National Conference on Artificial Intelligence, Aug. 1996, pp. 944-951.
Yang et al., "HDNET: Exploiting HD maps for 3D object detection," Proceedings of the 2nd Conference on Robot Learning, PMLR, 2018, 87:146-155.
Zhan et al., "Interaction dataset: An international, adversarial and cooperative motion dataset in interactive driving scenarios with semantic maps," CoRR, Sep. 30, 2019, arXiv:1910.03088, 13 pages.
Office Action in Chinese Appln. No. 202210273001.1, dated Jun. 28, 2024, 19 pages.

* cited by examiner

PREDICTING THE FUTURE MOVEMENT OF AGENTS IN AN ENVIRONMENT USING OCCUPANCY FLOW FIELDS

CROSS-REFERENCE TO RELATED APPLICATIONS

This application claims the benefit of U.S. Provisional Application No. 63/162,988, filed on Mar. 18, 2021 and U.S. Provisional Application No. 63/316,801, filed on Mar. 4, 2022. The disclosure of these prior applications is considered part of and is incorporated by reference in the disclosure of this application.

BACKGROUND

This specification relates to predicting the motion of agents in an environment.

The environment may be a real-world environment, and the agents may be, e.g., vehicle, pedestrians, or cyclists in the environment. Predicting the motion of objects is a task required for motion planning, e.g., by an autonomous vehicle.

Autonomous vehicles include self-driving cars, boats, and aircraft.

SUMMARY

This specification generally describes a system implemented as computer programs on one or more computers in one or more locations that generates features of a top-down representation of an environment and then processes the features of the top-down representation of the environment using a neural network to generate a prediction that characterizes the future motion of agents in the environment.

More specifically, the prediction specifies, for each future time point in a sequence of future time points and for each agent type in a set of one or more agent types, (i) an occupancy prediction for the future time step that specifies, for each grid cell in the top-down representation, an occupancy likelihood that any agent of the agent type will occupy the grid cell at the future time point, and (ii) a motion flow prediction that specifies, for each grid cell, a motion vector that represents predicted motion of agents of the agent type within the grid cell at the future time point.

Thus, for a given agent type, the system processes the same features of the same top-down representation to generate, in parallel, both a set of occupancy predictions and a set of motion flow predictions. For example, the system can generate a single feature map for a given agent type that includes both the occupancy predictions for the agent type and the motion flow predictions for the agent type.

The subject matter described in this specification can be implemented in particular embodiments so as to realize one or more of the following advantages.

Motion forecasting is an essential component of planning in a multi-agent environment, and of particular interest for autonomous driving.

Some existing approaches model the uncertain future, i.e., take into consideration that future motion of agents may have multiple plausible future realizations, as a distribution over a compact set of trajectories per agent. Relative to this, occupancy grid-based approaches that generate occupancy predications provide some significant advantages: the non-parametric occupancy predictions capture a richer class of future distributions, incorporate shape and identity uncertainty, and model the joint probability of the existence of any agent in a spatiotemporal cell (rather than independent marginal probabilities per agent). While these advantages make occupancy grids an attractive choice, occupancy grid methods have the disadvantage that agent identity is lost, i.e., that it is not apparent from a given occupancy prediction which agent is likely to occupy the corresponding grid cell (only that some agent is likely occupy the cell), and there is no obvious way to extract motion from the grids (which are a snapshot of a time interval). This makes it unclear how to interpolate between occupancy predictions at a finer time granularity, and impossible to predict the velocity of individual agents directly from the occupancy predictions.

This specification, on the other hand, describes occupancy flow fields which extend standard occupancy grids with flow fields. That is, the described techniques also predict, for each grid cell and at each future time point, a motion flow prediction that represents the predicted motion of any agent of the appropriate type within the grid cell. By augmenting the output with flow estimates, the described techniques allow a system, e.g., a planning system for an autonomous vehicle, to trace occupancy from far-future grid locations back to current time locations by following the sequence of predicted flow vectors. Thus, the disadvantage of not being able to recover agent identity from occupancy predictions is overcome, i.e., because this "trace" allows recovering the most-likely agent identity for any future grid cell, while maintaining the above-described advantages.

Another advantage for incorporating flow predictions is that it allows an occupancy model to capture future behavior with fewer "key frames," i.e., with sequences with fewer, more spaced-out future time steps, since flow predictions can be used to warp or morph occupancy at any continuous point in time, allowing for effective interpolation at time points that are between two time points for which occupancy predictions exist. That is, if the planning system of an autonomous vehicle requires an occupancy prediction for a time point that is not one of the future time points in the sequence for which predictions have been generated, the system can use the flow predictions at one or more adjacent future time points in the sequence to modify ("warp") the occupancy predictions at the one or more adjacent future time points to generate an occupancy prediction for the required time point.

Additionally, when the flow formulation captures multiple travel directions for each agent, the morphing process will lead to a conservative expansion of occupancy from the last known occupancy of agents. Therefore, the morphed occupancy can be safely used by a planning system that plans paths for the autonomous vehicle that minimize colocation of the vehicle with predicted occupancy.

Even further, because the described techniques do not make agent-centric predictions but model future behavior using occupancy and flow predictions, the system can effectively make predictions that incorporate the behavior of agents that have not yet been detected and tracked as of the current time point. In particular, given the current state-of-the-art in real-time perception, the track quality available to a motion forecasting system can be limited. For example, a system may not be able to effectively track agents because of occlusions or increased distance. More importantly, new agents may appear through dis-occlusion or otherwise entering the autonomous vehicle's field of view. Reasoning about the location and velocity of these so-called speculative agents is critical for safe and effective autonomous driving. Trajectory prediction models that predict respective trajectories for already-detected and tracked agents cannot handle agents that may come out of occluded areas or may come within range of a sensor, while the described techniques can incorporate the likelihood of such events occurring within the occupancy and flow predictions at the future time steps.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as a "motion prediction system," to generate an occupancy flow prediction that characterizes the predicted future motion of surrounding agents in the vicinity of the vehicle in an environment.

In this specification, a "surrounding agent" can refer, without loss of generality, to a vehicle, bicycle, pedestrian, ship, drone, or any other moving object in an environment.

This specification also describes how training examples generated by vehicles or by other sources can be used to effectively train the motion prediction system to accurately and reliably make predictions.

Figure 1:
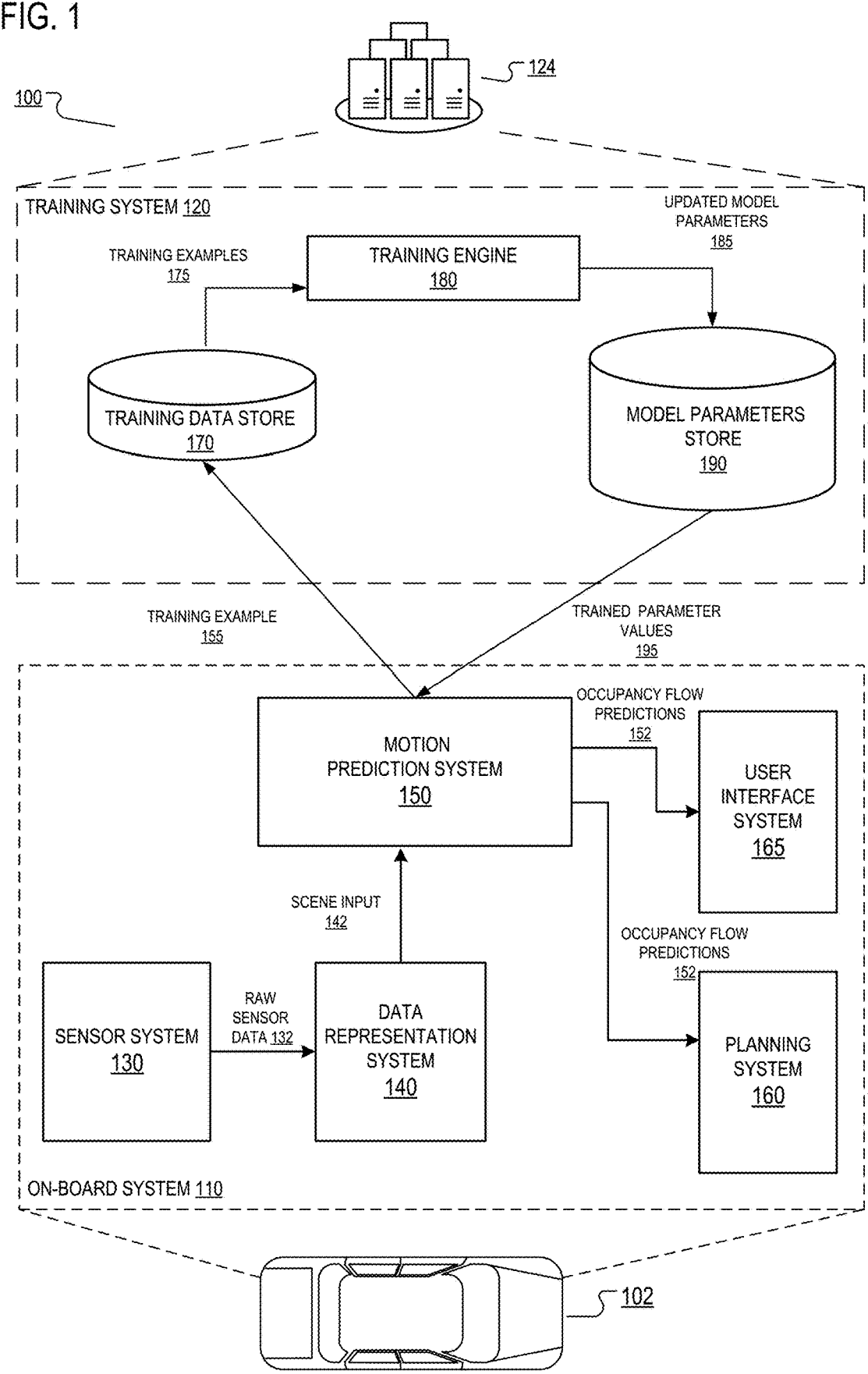
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and other data characterizing the environment, e.g., map data that identifies map features in the vicinity of the vehicle, and generates scene data 142. The scene data 142 characterizes the current state of the environment surrounding the vehicle 102 as of the current time point.

In particular, the scene data 142 includes at least (i) data characterizing observed trajectories for each of one or more agents in an environment, i.e., observed trajectories for one or more of the surrounding agents, that is generated from the outputs of the sensor subsystems 130 and (ii) road graph data characterizing map features of a map of the environment. The data characterizing the observed trajectories can include data specifying the location of the corresponding surrounding agent at the current time step and one or more time steps that precede the time step. The data can optionally also include other information, e.g., the heading of the agent, the velocity of the agent, the type of the agent, and so on. Map features can include lane boundaries, crosswalks, stoplights, road signs, speed bumps, and other types of road features.

The data representation system 140 provides the scene data 142 to a motion prediction system 150, also on-board the vehicle 102.

The motion prediction system 150 processes the scene data 142 to generate features of a top-down representation of the environment. The top-down representation of the environment is a grid that includes a plurality of grid cells that each represent a region of the scene in the environment. For example, the grid can be centered at the current location of the vehicle 102 and can include evenly-spaced grid cells that cover a predetermined-sized region around the vehicle 102 in the environment. The features generally include a respective feature, e.g., a feature vector, a feature matrix, or a higher-order feature tensor, for each of the grid cells in the top-down representation.

The motion prediction system 150 then processes the scene data 142 to generate an occupancy flow prediction 152.

The occupancy flow prediction 152 includes a respective output for each future time point in a sequence of future time points and for each agent type in a set of one or more agent types.

The sequence of future time points generally includes a fixed number of future time points, e.g., evenly-spaced future time points that cover a future time window of predetermined length.

In some cases, there is only a single agent type, e.g., all dynamic agents are designated with the same type or the system only makes predictions for a certain kind of dynamic agent, e.g., a vehicle or a pedestrian or a cyclist. In some other cases, there are multiple agent types, e.g., the system makes one set of predictions for vehicles and one set of predictions for pedestrians.

Thus, when there is a single agent type, there a single output per future time point. When there are multiple agent types, there are multiple outputs per future time point, i.e., one for each of the multiple agent types.

The output for a given agent type and for a given future time point includes (i) an occupancy prediction for the future time step that specifies, for each grid cell in the top-down representation, an occupancy likelihood that any agent of the agent type will occupy the grid cell at the future time point and (ii) a motion flow prediction that specifies, for each grid cell, a motion vector that represents predicted motion of agents of the agent type within the grid cell at the future time point.

Generally, for each grid cell and at each future time point, the motion vector represents, for a portion of the scene located at the grid cell at the future time point, a prediction of a change of position of the portion between a corresponding preceding time point and the future time point. For the first future time point in the sequence, the corresponding preceding time point is the current time point. For each subsequent time point in the sequence, the corresponding time point is the immediately preceding future time point in the sequence.

As a particular example, the motion vector can be equal to a predicted difference between (i) the coordinates of the grid cell and (ii) the coordinates of the grid cell occupied by the portion of the scene at the corresponding preceding time point. Thus, the motion vector is a two-dimensional vector that specifies the predicted motion of any agent of the corresponding agent type located at the grid cell at the future time step in units of grid cells within the top-down representation. However, each coordinates can be real-valued, i.e., the coordinates are not required to be integer values that uniquely identify a grid cell and can be a real-valued coordinate that has a value that is between the integers representing two grid cells.

Generally, for each grid cell and at each future time point, the occupancy likelihood represents the predicted likelihood that any part of any agent of the agent type will occupy the grid cell at the future time point. That is, the grid cell is considered occupied at the corresponding future time step if any part of any agent of the agent type occupies the grid cell, regardless of which agent of the agent type is occupying the grid cell.

In particular, the occupancy flow prediction 152 can include, for each agent type, a feature map that includes, for each grid cell, a respective vector that specifies the occupancy likelihoods and the motion vectors for the grid cell at each of the future time points. Thus, the feature map includes, for each grid cell, two values for each future time point that represent the motion vectors of the agents for the agent type and one value for each future time point that represents the occupancy likelihood that represent the motion vector.

Generally, the motion prediction system 150 generates the occupancy flow prediction 152 using a set of trained neural networks, i.e., in accordance with trained model parameters 195 of the set of trained neural networks. Generating the occupancy flow prediction 152 is described in more detail below with reference to FIGS. 2 and 3.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the occupancy flow predictions 152 generated by the motion prediction system 150 to one or more other on-board systems of the vehicle 102, e.g., the planning system 160 and/or a user interface system 165.

When the planning system 160 receives the occupancy flow predictions 152, the planning system 160 can use the occupancy flow predictions 152 to generate planning decisions that plan a future trajectory of the vehicle, i.e., to generate a new planned vehicle path.

For example, the occupancy flow predictions 152 may contain a prediction that a particular grid cell is to be occupied at a particular future time point, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

As another example, the planning system 160 can use the occupancy flow prediction 152 to predict the possible behavior of agents that are currently visible in the environment at the current time step. For example, the planning system 160 can determine, for each of one or more of the future time points and for each grid cell, a subset of agents in the environment at the current time point that could be observed in the grid cell at future time point by iteratively warping an initial, observed occupancy at the current time point using motion flow predictions at future time points up to and including the future time point. Warping the occupancy using motion flow predictions is described below with reference to FIG. 3. Thus, although the outputs at the future time steps are not agent-specific, the system 160 can use the occupancy flow prediction 152 to recover plausible future trajectories for individual agents in the environment at the current time point When the user interface system 165 receives the occupancy flow predictions 152, the user interface system 165 can use the occupancy flow predictions 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the occupancy flow predictions 152 may contain a prediction that a particular grid cell that is in the current path of the vehicle 102 is likely to occupied in the future, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision is likely if the driver does not modify their path.

To generate the occupancy flow predictions 152, the motion prediction system 150 can use trained parameter values 195, i.e., trained model parameter values of the motion prediction system 150, obtained from a model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the motion prediction system i.e., to determine the trained parameter values 195 of the motion prediction system 150. The training data store 170 receives raw training examples from agents operating in the real world. For example, the training data store 170 can receive a raw training example 155 from the vehicle 102 and one or more other agents that are in communication with the training system 120. The raw training example 155 can be processed by the training system 120 to generate a new training example. The raw training example 155 can include scene data, i.e., like the scene data 142, that can be used as input for a new training example. The raw training example 155 can also include outcome data characterizing the state of the environment surrounding the vehicle 102 at the one or more future time points. This outcome data can be used to generate ground truth occupancies and ground truth flows for each grid cell and for each of the one or more agent types and for each of the one or more future time points.

The ground-truth occupancy at a given future time point is equal to 1 if any part of any agent of the corresponding agent type was located within the corresponding grid cell at the given future time point and equal to 0 if no part of any agent of the corresponding agent type was located within the corresponding grid cell at the given future time point.

If any part of any agent of the corresponding agent type was located within the corresponding grid cell at the given future time point, the ground truth flow identifies the actual difference between the coordinates of the grid cell and the coordinates of the grid cell in which the agent was located at the preceding time point. If no part of any agent of the corresponding agent type was located within the corresponding grid cell at the given future time point, the ground truth flow can be marked as invalid, i.e., so that no loss will be computed for the corresponding prediction.

The training data store 170 provides training examples 175 to a training engine 180, also hosted in the training system 120.

The training engine 180 uses the training examples 175 to update model parameters that will be used by the motion prediction system 150, and provides the updated model parameters 185 to the model parameters store 190.

That is, the training engine 180 trains the neural networks used by the motion prediction system 150 on the training examples 175 to minimize a loss function using gradient-based machine learning techniques. Training the neural networks and the loss function used for the training are described in more detail below with reference to FIG. 2.

Once the parameter values of the motion prediction system 150 have been fully trained, the training system 120 can send the trained parameter values 195 to the motion prediction system 150, e.g., through a wired or wireless connection.

Figure 2:
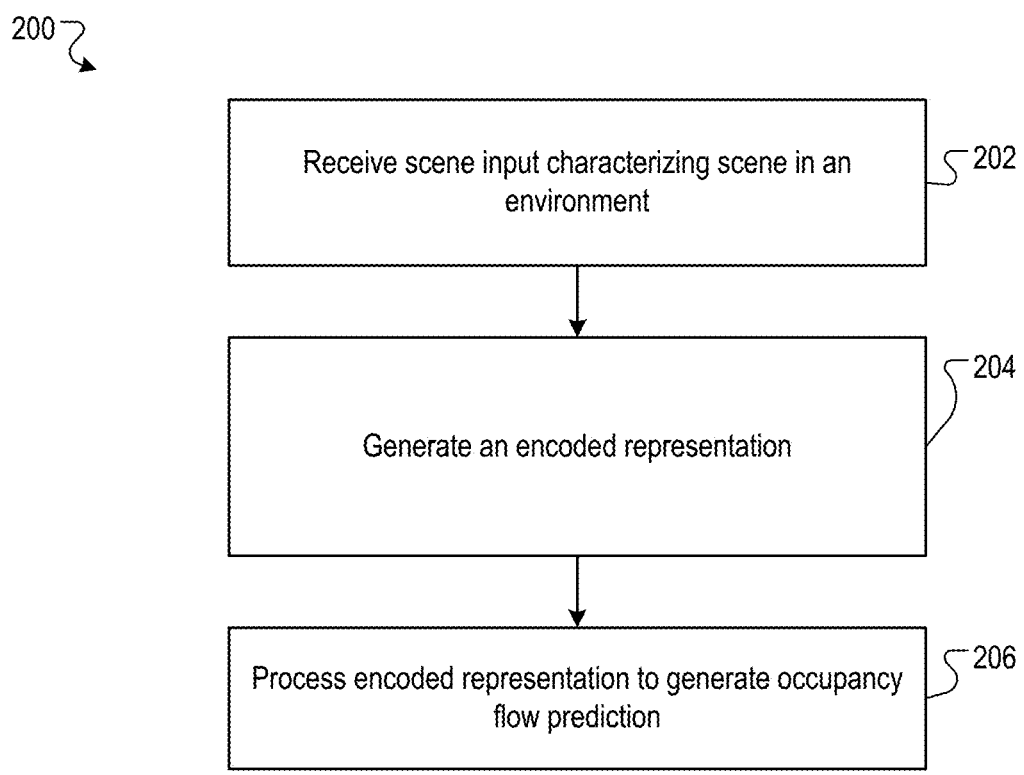
FIG. 2 is a flow diagram of an example process for generating occupancy flow predictions.

FIG. 2 is a flow diagram of an example process 200 for generating an occupancy flow prediction. For convenience, the process 200 will be described as being performed by a system of one or more computers located in one or more locations. For example, a training system, e.g., the training system 120 of FIG. 1, appropriately programmed in accordance with this specification, can perform the process 200.

The system receives an input characterizing a scene in an environment at a current time point (step 202). A "scene" in an environment is the region of the environment that is within the range of the sensors of the autonomous vehicle.

In particular, the system obtains input from at least two sources.

The first source is a map of the environment, i.e., a map of the scene of the environment. The data obtained from the map of the environment includes data characterizing one or more road features, e.g., lanes, crosswalks, speed bumps, traffic lights, and so on, identified in the map of the environment.

The second source is the output of a perception system that processes sensor readings to detect objects in the environment, e.g., of the sensor subsystem 130 of FIG. 1. The data obtained from the output of the perception system includes data characterizing observed trajectories for each of one or more agents in the environment up to the current time point.

The system generates, from the input, an encoded representation that includes respective features for each grid cell in a top-down representation of the environment (step 204). Generally, the system processes data derived from the input using an encoder neural network to generate the respective features.

For example, the system can represent the input as a plurality of points in the top-down representation that are each associated with attributes and that represent the scene in the environment at the current time point and then process the attributes of the points in each grid cell using an encoder neural network to generate the features for the grid cell.

One example technique for generating the encoded representation is described above with reference to FIG. 3.

The system processes the encoded representation using a decoder neural network that is configured to process the encoded representation to generate an occupancy flow prediction (step 206).

The occupancy flow prediction specifies, for each future time point in a sequence of future time points and for each agent type in a set of one or more agent types: (i) an occupancy prediction for the future time step that specifies, for each grid cell, an occupancy likelihood that any agent of the agent type will occupy the grid cell at the future time point and (ii) a motion flow prediction that specifies, for each grid cell, a motion vector that represents predicted motion of agents of the agent type within the grid cell at the future time point.

Thus, for a given agent type, the system processes the same encoded representation to generate, in parallel, both a set of occupancy predictions and a set of motion flow predictions.

In some cases, there is only a single agent type, e.g., all dynamic agents are designated with the same type or the system only makes predictions for a certain kind of dynamic agent, e.g., a vehicle or a pedestrian or a cyclist. In some other cases, there are multiple agent types, e.g., the system makes one set of predictions for vehicles and one set of predictions for pedestrians.

As described above, a training system trains the neural networks components, i.e., the encoder and decoder neural networks, used to generate the occupancy predictions on batches of training examples to minimize a loss function using any appropriate machine learning training technique, e.g., a gradient descent technique with any appropriate optimizer, e.g., stochastic gradient descent, Adam, rmsProp, or Adafactor. Generally, gradients are backpropagated through the decoder neural network and into the encoder neural network during the training.

As described above, each training example includes a training input, i.e., training scene data characterizing a scene in an environment, and for each of the agent types, ground-truth occupancies at each of the set of future time points and ground-truth flows at each of the set of future time points.

Generally, the loss function includes (i) an occupancy loss that measures errors in occupancy predictions relative to corresponding ground-truth occupancies and (ii) a flow loss that measures errors in motion flow predictions relative to corresponding ground-truth flows.

For example, the occupancy loss can be a logistic cross-entropy loss per grid cell, e.g., the average or the sum across all grid cells, all agent types, and all future time steps within the batch.

As another example, the flow loss can be an L1-norm regression loss with respect to the ground-truth flow, e.g., the average or the sum across all agent types, all future time steps, and all grid cells that have a valid ground-truth flow, i.e., for which an agent of the corresponding agent type was actually located at the corresponding grid cell at the corresponding time.

Optionally, the loss function can also include a flow trace loss. The flow trace loss measures, for each future time point, each grid cell, and each agent type, an error between (i) a product of a flow-warped occupancy for the future time point and the occupancy prediction for the future time point and (ii) the ground-truth occupancy for the future time point. Thus, the flow trace loss measures the accuracy of warping the initial occupancy at the current time point using the motion flow predictions.

The flow-warped occupancy for each future time point is generated by iteratively warping an initial, observed occupancy at the current time point using motion flow predictions at future time points up to and including the future time point. That is, at each future time point, the flow-warped occupancy generated from the preceding flow-warped occupancy and the flow field for the future time step that includes the motion vectors for all of the grid cells for the time step. For the first future time point, the preceding flow-warped occupancy is the observed occupancy at the current time point that indicates, for each grid cell, whether any agent of the corresponding type was present at the grid cell.

Generating the flow-warped occupancy for a given future time point is described below with reference to FIG. 4.

For example, the overall loss function can be a sum or a weighted sum of the individual losses, e.g., with the weights for the losses being hyperparameters of the training.

Once the training system has trained the motion prediction system, the training system can evaluate the performance of the motion prediction system using any of a variety of metrics. For example, the system can determine whether the motion prediction system has, for each metric in a set of metrics, a metric value that satisfies a threshold and determine to deploy the motion prediction on-board the vehicle, i.e., by providing the trained parameter values to the on-board system for the vehicle, only if the motion prediction system has metric values that satisfy the thresholds.

The set of metrics can include any of one or more metrics.

As one example, the set can include one or more occupancy metrics that measures the quality of the occupancy predictions.

One example of such a metric is an Area under the Curve (AUC) metric. The AUC metric computes, for each agent type and for each future time point, the area under the precision-recall curve for different precision-recalls computed at different occupancy likelihood thresholds, e.g., linearly-spaced thresholds on the interval [0,1].

Another example occupancy metric is a Soft Intersection over Union (Soft-IoU) metric that measures, for each agent type and for each future time point, the area of the overlap between the occupancy predictions and the ground truth occupancy.

For example, the Soft-IoU metric can be equal to, for each agent type and for each future time point, the ratio of (i) the sum over the grid cells of the product between the predicted occupancy likelihood for the grid cell and the ground truth occupancy for the grid cell to (i) the sum over grid cells of the sum of (i) predicted occupancy likelihood for the grid cell, (b) the ground truth occupancy for the grid cell, and (iii) the product between the predicted occupancy likelihood for the grid cell and the ground truth occupancy for the grid cell.

As one example, the set can include one or more flow metrics that measures the quality of the flow predictions.

One example of such a metric is an End-Point Error (EPE) metric. The EPE metric computes the mean End-Point Error L2 distance, i.e., the mean of, for each agent type and for each future time point, the L2 distances between the predicted motion vector and the ground truth flow for grid cells that have valid ground truth flow.

Another example of such a metric is an ID Recall metric. The ID Recall metric measures the percentage of correctly-recalled IDs for each ground-truth occupancy grid. That is, for each future time step and for each agent type, the ID Recall metric measures the ratio of (i) the number of grid cells for which the flow-warped occupancy for the future time step indicates that the correct agent is located at the grid cell and (ii) the total number of grid cells that are occupied at the future time point according to the ground truth occupancy.

As another example, the set can include one or more combined metrics that measure the quality of the flow predictions and the occupancy predictions.

One example of such a metric is a Flow Traced (FT) AUC metric. The Flow Traced AUC metric is computed as the AUC metric described above, but with the predicted occupancy likelihood replaced by the likelihoods in the flow-warped occupancy for the future time step.

Another example of such a metric is a Flow Traced (FT) IoU metric. The Flow Traced IoU metric is computed as the (Soft-IoU) metric described above, but with the predicted occupancy likelihood replaced by the likelihoods in the flow-warped occupancy for the future time step.

Figure 3:
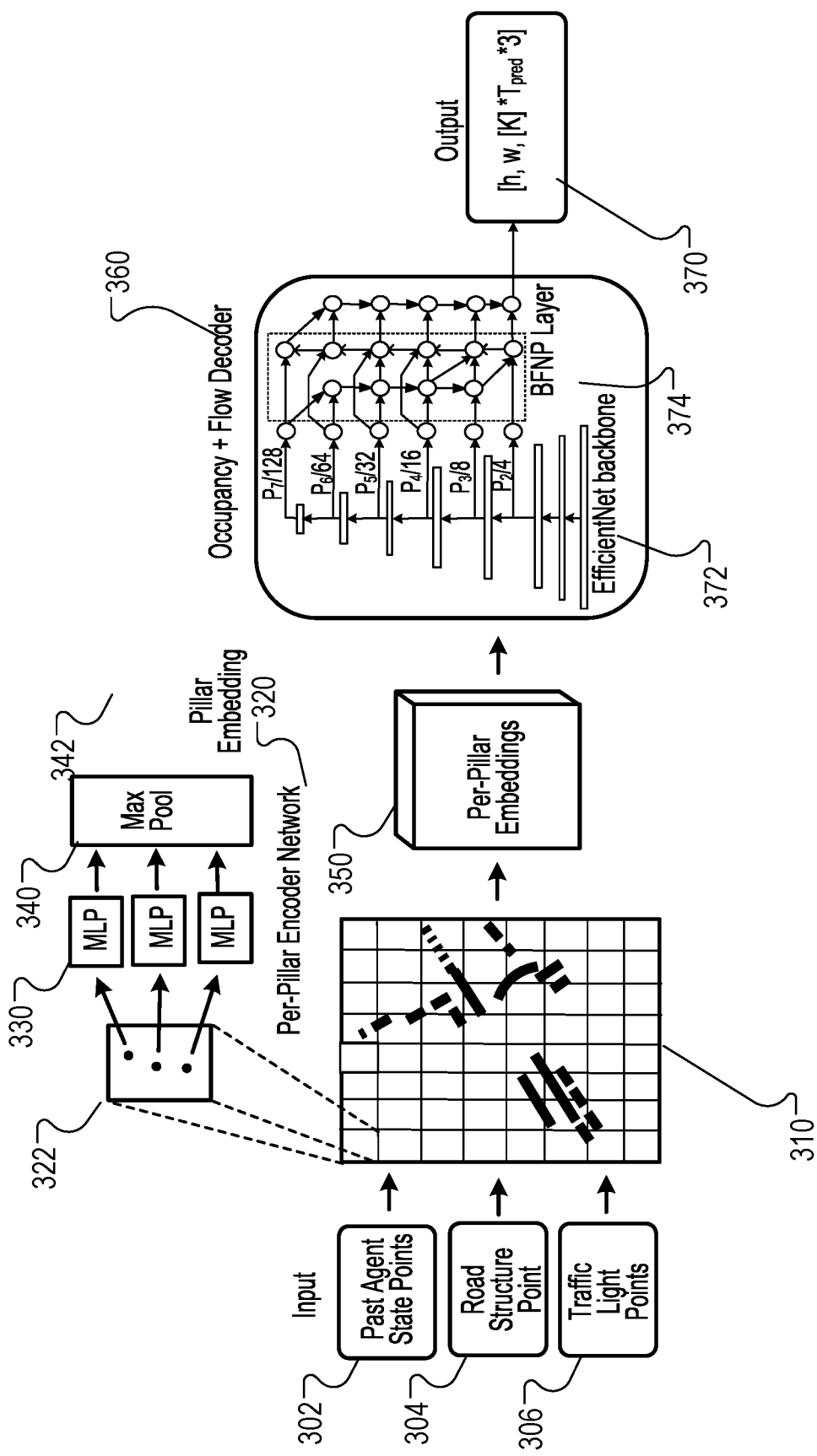
FIG. 3 shows an example of the operations performed by the motion prediction system.

FIG. 3 shows an example of the operations performed by the motion prediction system 150.

As described above, the system 150 obtains input from at least two sources: (i) a map of the environment and (ii) the output of a perception system that processes sensor readings to detect objects in the environment.

Additionally, the system 150 represents the input as a plurality of points in the top-down representation 310 that are each associated with attributes and that represent the scene in the environment at the current time point. Generally, the attributes for each point identify at least the coordinates of the point in the top-down representation 310, i.e., which grid cell in the top-down representation 310 the point belongs to.

In particular, in the example of FIG. 3, the data obtained from the output of the perception system is represented as a set of past agent state points 302, i.e., data characterizing observed trajectories for each of one or more agents in the environment up to a current time point.

Each observed agent is represented by one or more points at each of one or more time points at which the agent was observed up to the current time point. For example, at each time point at which the agent was observed, the points can be sampled as a fixed-size grid of points sampled uniformly from within a box representing the agent's position at the time point in the representation. The attributes of a given time point can include attributes representing the state of the agent at the corresponding time point. For example, the attributes can include any one or more of: the agent's center position, the orientation of the box representing the agent's position, the box width and length, the velocity of the agent at the time step, the acceleration of the agent at the time step, the type of the agent, and so on.

The data obtained from the map of the environment is represented as road structure points 304 and traffic light points 306.

The road structure points for a given road feature, e.g., lane, crosswalk, or other traffic objects, can be a set of points sampled uniformly from the line segments and curves representing the road feature. The attributes can identify the position of the point and the type of the underlying road feature, e.g., selected from a set that includes one or more of crosswalk, speed bump, stop/yield sign, road edge boundary, parking line, dotted line, solid single/double line, and solid double yellow line.

The traffic light point for a given traffic light can be located at the grid cell in which the traffic light is located and the attributes can identify the position of the traffic light, i.e., placed at the end of the traffic-controlled lane controlled by the traffic light, and the light state, which is one of red, yellow, green, unknown, and which can be obtained from the outputs of the perception system.

The system 150 generates, from the state points 302, the road structure points 304, and the traffic light points 306, an encoded representation 350 that includes respective features (also referred to as "embeddings") for each grid cell in the top-down representation 310 of the environment (also referred to as "pillars" of the top-down representation 310).

In the example of FIG. 3, to generate the encoded representation 350, for each grid cell, the system 150 identifies points that are within the grid cell and processes the attributes of the points that are within the grid cell using an encoder neural network ("per-pillar encoder neural network") 320 to generate the respective features for the grid cell.

As shown in FIG. 3, for example, a grid cell 322 in the top-down representation 310 includes three points and the encoder neural network 320 includes a multi-layer perceptron (MLP) 330 and a pooling layer 340, e.g., a max pooling layer or an average pooling layer. The system 150 processes the attributes for each point in the grid cell using the MLP 330 to generate features for the point. The system 150 then processes the features for each of the points using the pooling layer 340, i.e., applies a corresponding pooling operation to the features for the points, to generate the features 342 for the grid cell (the "embedding" for the "pillar").

The system processes the encoded representation (the "per-pillar embeddings") 350 using a decoder neural network 360. The decoder neural network 360 is configured to process the encoded representation 350 to generate a decoder output 370. As shown in FIG. 3, the decoder output 370 is a [h, w, $|K|*T_{pred}*3$] tensor, i.e., an h×w feature map with $|K|*T_{pred}*3$ channels, where h is the height of the top-down representation, w is the width of the top-down representation, $|K|$ is the number of agent types, $T_{pred}$ is the number of future time steps in the sequence, and 3 is the sum of the 2 values necessary to represent each motion vector (e.g., the x and y components of the motion vector) for a given agent type and a given grid cell and the 1 value necessary to represent the occupancy likelihood for a given agent type and a given grid cell.

Thus, the decoder output 370 specifies, for each future time point in a sequence of $T_{pred}$ future time points and for each of agent type in a set of K agent types: an occupancy prediction for the future time step that specifies, for each of the h×w grid cells, an occupancy likelihood that any agent of the agent type will occupy the grid cell at the future time point, and a motion flow prediction that specifies, for each grid cell, a motion vector that represents predicted motion of agents of the agent type within the grid cell at the future time point.

Thus, from the same encoded representation 310, the decoder neural network 360 generates, in parallel, both the occupancy predictions and the motion flow predictions.

The decoder neural network 370 can generally have any appropriate architecture that allows the neural network 370 to map a respective embedding for each grid cell to a respective occupancy prediction and motion flow prediction for each grid cell. For example, the decoder neural network 370 can be fully-convolutional neural network that maps an input feature map to an output feature map having the same dimensionality but a different number of channels.

In the particular example of FIG. 3, the decoder neural network 370 includes a convolutional neural network backbone 372 that generates, from the encoded representation 310, multiple feature maps at different spatial scales. As a particular example, the convolutional backbone can have an EfficientNet architecture that generates feature maps ($P_2$, . . . , $P_7$), where $P_i$ is downsampled by 2i from the preceding spatial scale.

The decoder neural network 370 also includes a fusion neural network 374 that fuses the multi-scales features to generate fused features for at least the highest-resolution feature map. In the example of FIG. 3, the fusion neural network 374 is a BiFPN (Bi-directional Feature Pyramid Network) that fuses the multi-scale features in a bidirectional manner.

The decoder neural network 370 then uses the highest-resolution feature map $P_2$ to regress occupancy and flow predictions for all agent classes K over all $T_{pred}$ future time steps, e.g., by processing the highest-resolution feature maps using a multi-layer perceptron (MLP) or a convolutional neural network.

Figure 4:
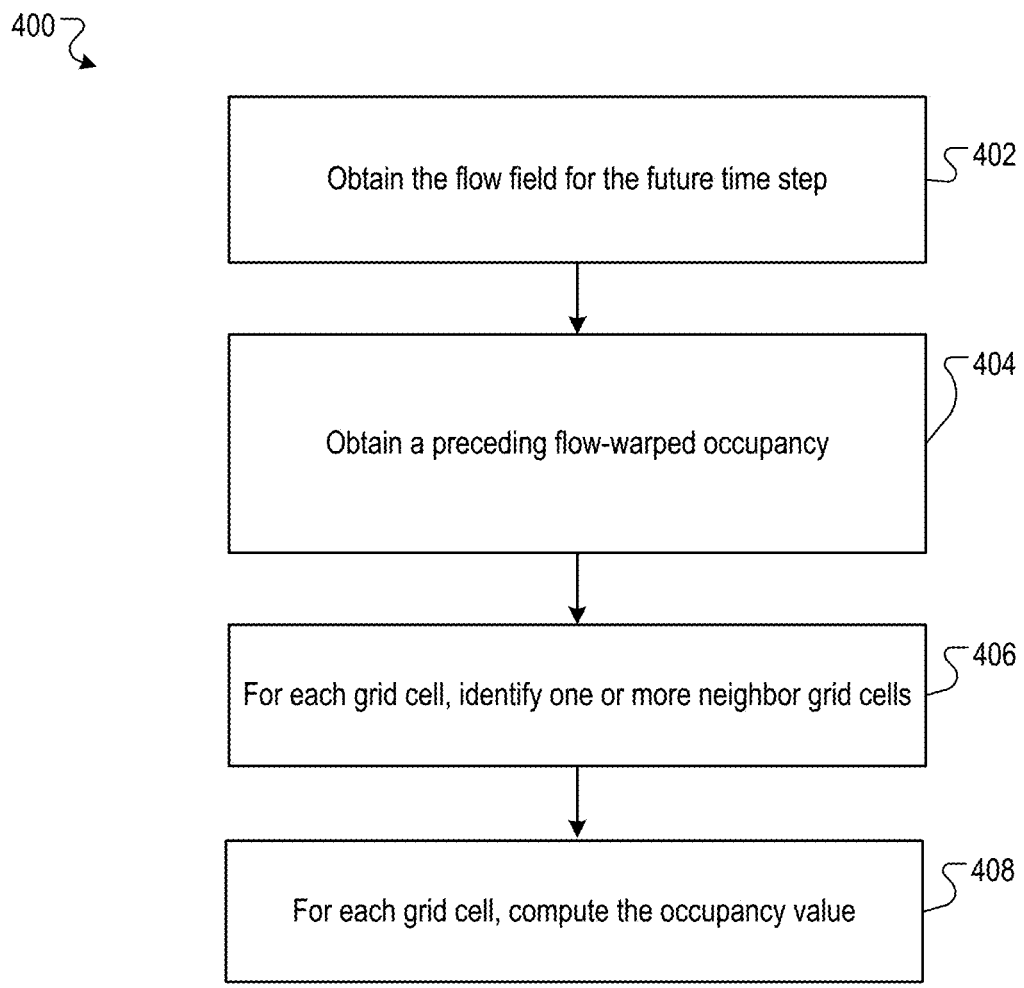
FIG. 4 is a flow diagram of an example process for generating a flow-warped occupancy for a future time point for a given agent type.

FIG. 4 is a flow diagram of an example process 400 for generating a flow-warped occupancy for a future time point for a given agent type. For convenience, the process 400 will be described as being performed by a system of one or more computers located in one or more locations. For example, a training system, e.g., the training system 120 of FIG. 1, or an on-board system, e.g., the on-board system 110 of FIG.

1, appropriately programmed in accordance with this specification, can perform the process 400.

The system obtains the flow field for the future time step for the given agent type that includes the motion vectors for the grid cells (step 402).

The system obtains a preceding flow-warped occupancy for the given agent type (step 404). The preceding flow-warped occupancy has a respective value for each grid cell in the top-down representation. For the first future time point, the preceding flow-warped occupancy is the observed occupancy at the current time point that indicates, for each grid cell, whether any agent of the corresponding type was present at the grid cell. That is, all of the values in the observed occupancy are either zero or one. As will be described below, the values in the flow-warped occupancies for the future time points are real values between zero and one, inclusive, i.e., and are not necessarily equal to zero or to one.

For each grid cell, the system identifies one or more grid cells that neighbor the position in the top-down representation that is identified by the motion vector for the grid cell, i.e., the position of the portion of the scene at the grid cell at the preceding time point, (step 406) and computes the occupancy value for the grid cell in the flow-warped occupancy for the future time point by interpolating between the occupancy values for the neighbor grid cells in the preceding flow-warped occupancy (step 408).

For example, the system can identify as a neighbor grid cell each grid cell that is within a threshold distance of the position identified by the motion vector or can identify a threshold number of grid cells that are closest to the position identified by the motion vector.

The system can then interpolate between the occupancy values by performing an interpolation, e.g., a bilinear sampling (bilinear interpolation), based on the position and the coordinates of each of the neighbor grid cells to generate a respective weight for each neighbor grid cell. The system can then compute the occupancy value for the grid cell as a weighted sum of the occupancy values for the neighbor grid cells in the preceding flow-warped occupancy, i.e., weighted by the weight for the corresponding neighbor grid cell. Because the occupancy value is computed as a weighted sum, the occupancy values are not required to be equal to zero or one but instead fall in a range between zero and one, inclusive.

The system can perform the process 400 during training to compute the loss function for the training, can perform the process 400 on-board a vehicle to determine plausible future trajectories for the agents that are observed at the environment at the current time step, or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
    obtaining, by an autonomous vehicle navigating through an environment, an input characterizing a scene in the environment at a current time point;
    generating, by the autonomous vehicle and from the input, an encoded representation that includes respective features for each grid cell in a top-down representation of the environment;
    processing, by the autonomous vehicle, the encoded representation using a decoder neural network that is configured to process the encoded representation to generate a decoder output that comprises, for each future time point in a sequence of future time points and for each agent type in a set of one or more agent types:
    a feature map that specifies, for each grid cell, (i) an occupancy score that represents a likelihood that any agent of the agent type will occupy the grid cell at the future time point, and (ii) a motion vector that represents predicted motion of agents of the agent type within the grid cell at the future time point, wherein the agents of the agent type are different from the autonomous vehicle.

2. The method of claim 1, wherein the decoder output comprises, for each agent type, a feature map that includes, for each grid cell, a respective vector that specifies the occupancy likelihoods and the motion vectors for the grid cell at each of the future time points.

3. The method of claim 1, wherein, for each grid cell and at each future time point, the motion vector represents, for a portion of the scene located at the grid cell at the future time point, a prediction of a change of position of the portion between a corresponding preceding time point and the future time point.

4. The method of claim 3, wherein, for each grid cell and at each future time point, the motion vector is equal to a predicted difference between (i) the coordinates of the grid cell and (ii) the coordinates of the grid cell occupied by the portion of the scene at the corresponding preceding time point.

5. The method of claim 3, wherein, for the first future time point in the sequence, the corresponding preceding time point is the current time point, and wherein for each subsequent time point in the sequence, the corresponding time point is the immediately preceding future time point in the sequence.

6. The method of claim 1, wherein the input comprises a plurality of points in the top-down representation that are each associated with attributes and that represent the scene in the environment at the current time point, and wherein the attributes identify at least coordinates of the point in the top-down representation.

7. The method of claim 6, wherein generating, from the input, an encoded representation that includes respective features for each grid cell in the top-down representation of the environment comprises, for each grid cell:
    identifying points that are within the grid cell; and
    processing the attributes of the points that are within the grid cell using an encoder neural network to generate the respective features for the grid cell.

8. The method of claim 6, wherein the plurality of points comprise:
    for each of one or more agents in the environment, one or more respective trajectory points for each of a plurality of time points in an observed trajectory of the agent that represent a state of the agent at the time point.

9. The method of claim 6, wherein the plurality of points comprise:
    for each of one or more road elements, a respective set of road element points representing the road element.

10. The method of claim 6, wherein the plurality of points comprise:
    for each of one or more traffic lights, a respective point representing the traffic light.

11. The method of claim 1, wherein the set of agent types comprises a plurality of agent types and wherein the decoder neural network comprises a respective neural network head that generates the occupancy and flow predictions for each agent type.

12. The method of claim 1, wherein the decoder neural network has been trained on training data that includes a plurality of training inputs and, for each training input and for each of the agent types, ground-truth occupancies at each of the set of future time points and ground-truth flows at each of the set of future time points.

13. The method of claim 12, wherein the decoder neural network has been trained on the training data to minimize a loss function that comprises (i) an occupancy loss that measures errors in occupancy predictions relative to corresponding ground-truth occupancies and (ii) a flow loss that measures errors in motion flow predictions relative to corresponding ground-truth flows.

14. The method of claim 13, wherein the loss function further comprises a flow trace loss that measures, for each future time point, an error between (i) a product of a flow-warped occupancy for the future time point and the occupancy prediction for the future time point and (ii) the ground-truth occupancy for the future time point, wherein the flow-warped occupancy for each future time point is generated by iteratively warping an initial, observed occupancy at the current time point using motion flow predictions at future time points up to and including the future time point.

15. The method of claim 12, wherein the ground-truth occupancies at each of the set of future time points and ground-truth flows at each of the set of future time points reflect motion of agents that are not observed in the environment at the current time point.

16. The method of claim 1, further comprising:
    determining, for each of one or more of the future time points and for each grid cell, a subset of agents in the environment at the current time point that could be observed in the grid cell at future time point by iteratively warping an initial, observed occupancy at the current time point using motion flow predictions at future time points up to and including the future time point.

17. One or more non-transitory computer-readable storage media storing instructions that when executed by one or more computers cause the one or more computers to perform operations comprising:
    obtaining, by an autonomous vehicle navigating through an environment, an input characterizing a scene in the environment at a current time point;
    generating, by the autonomous vehicle and from the input, an encoded representation that includes respective features for each grid cell in a top-down representation of the environment;
    processing, by the autonomous vehicle, the encoded representation using a decoder neural network that is configured to process the encoded representation to generate a decoder output that comprises, for each future time point in a sequence of future time points and for each agent type in a set of one or more agent types:
        a feature map that specifies, for each grid cell, (ii) an occupancy score that represents a likelihood that any agent of the agent type will occupy the grid cell at the future time point, and (ii) a motion vector that represents predicted motion of agents of the agent type within the grid cell at the future time point, wherein the agents of the agent type are different from the autonomous vehicle.

18. A system comprising one or more computers and one or more storage devices storing instructions that when executed by one or more computers cause the one or more computers to perform operations comprising:

obtaining, by an autonomous vehicle navigating through an environment, an input characterizing a scene in an environment at a current time point;

generating, by the autonomous vehicle and from the input, an encoded representation that includes respective features for each grid cell in a top-down representation of the environment;

processing, by the autonomous vehicle, the encoded representation using a decoder neural network that is configured to process the encoded representation to generate a decoder output that specifies, for each future time point in a sequence of future time points and for each agent type in a set of one or more agent types:

a feature map that specifies, for each grid cell, (ii) an occupancy score that represents a likelihood that any agent of the agent type will occupy the grid cell at the future time point, and (ii) a motion vector that represents predicted motion of agents of the agent type within the grid cell at the future time point, wherein the agents of agent type are different from the autonomous vehicle.

19. The system of claim 18, wherein the decoder output comprises, for each agent type, a feature map that includes, for each grid cell, a respective vector that specifies the occupancy likelihoods and the motion vectors for the grid cell at each of the future time points.

20. The system of claim 18, wherein, for each grid cell and at each future time point, the motion vector represents, for a portion of the scene located at the grid cell at the future time point, a prediction of a change of position of the portion between a corresponding preceding time point and the future time point.

* * * * *